United States Patent [19]

Sankey

[11] Patent Number: 4,998,985
[45] Date of Patent: Mar. 12, 1991

[54] METHOD OF UTILIZING A VIDEOCASSETTE IDENTIFYING STORAGE AND DISPLAY SLEEVE

[75] Inventor: James K. Sankey, Hudson, Ohio

[73] Assignee: Alpha Enterprises, Inc., East Canton, Ohio

[21] Appl. No.: 507,916

[22] Filed: Apr. 12, 1990

[51] Int. Cl.⁵ ............... B65D 85/672; B31B 1/72; B31B 7/14

[52] U.S. Cl. ..................... 206/387; 40/312; 206/45.34; 206/459; 206/605; 206/634; 229/9; 229/19; 493/55; 493/82; 493/86; 493/102; 493/116; 493/121; 493/344; 493/377; 493/379

[58] Field of Search ............ 206/387, 449, 604, 605, 206/608, 634, 45.34, 459, 45.31; 229/9, 19, 87.05; 493/52, 55, 82, 86, 102, 116, 121, 342, 344, 377, 379; 40/312, 359, 360

[56] References Cited

U.S. PATENT DOCUMENTS

| | | |
|---|---|---|
| 3,286,905 | 11/1966 | Farukhi .................... 206/608 X |
| 3,458,109 | 7/1969 | Compton et al. ................ 229/9 |
| 3,835,988 | 9/1974 | Buttery ..................... 206/45.31 |
| 4,488,644 | 12/1984 | Wynalda ...................... 206/387 |
| 4,682,974 | 7/1987 | Sun .............................. 493/55 |
| 4,784,264 | 11/1988 | Sykes .......................... 206/387 |
| 4,802,601 | 2/1989 | Pijanowski et al. ........ 206/387 X |
| 4,813,534 | 3/1989 | Rosen ......................... 206/459 |
| 4,899,879 | 2/1990 | Rosen ......................... 206/445 |

Primary Examiner—Bryon P. Gehman
Attorney, Agent, or Firm—Michael Sand Co.

[57] ABSTRACT

The present invention relates to a videocassette storage and display sleeve having identifying indicia thereon for use with or without the videocassette. The sleeve is convertible from its rectangular box-like original form to a flattened display form with portions removed and then back to its reformed rectangular form with an adhesively-attachable tab member to form a partial sidewall to form the reconstituted rectangular box or cover. The method of reestablishing the original cover by reforming the rectangular form is also disclosed.

3 Claims, 3 Drawing Sheets

METHOD OF UTILIZING A VIDEOCASSETTE IDENTIFYING STORAGE AND DISPLAY SLEEVE

BACKGROUND OF THE INVENTION

1. Technical Field

This invention relates to containers, and in particular to a storage sleeve or cover for identifying, storing and displaying a videocassette. More particularly, the invention relates to such a sleeve or cover for storing and displaying a videocassette in which the videocassette can be quickly and easily slidably inserted into and removed from the sleeve or cover, the cover having printed indicia thereon identifying a prerecorded program on the videocassette and which cover may be displayed in several different embodiments.

2. Background Information

Rentals of videocassettes having prerecorded programs thereon such as popular movies, exercise routines, computer programs and instructions, and the like continue to increase as the number of homes and offices having videocassette recorders and/or players increases. As videocassette rentals and the number of program titles available on videocassette continue to increase very substantially, owners of stores which sell and rent the videocassettes continue to strive for more efficient ways of storing and displaying the videocassettes.

The current practice in most videocassette rental stores is to display chipboard covers or boxes having printed indicia thereon identifying the prerecorded programs on the cassettes, on shelves in areas of the store to which the public has access. Customers then are free to browse through the boxes to assist them in choosing which videocassettes they may wish to rent or purchase. After choosing a particular prerecorded program which a customer desires to view, after reviewing the identifying information, the customer either takes the empty chipboard box or cover for that videocassette from the shelf or some other means of identification, such as a code number or a tag corresponding to the videocassette, to a store employee stationed behind the counter. The employee then retrieves the desired videocassette from a storage area behind the counter or from a remote inventory room and completes the rental transaction. The customer usually takes the rented videocassette home in a usual videocassette storage container of a box-like type which is well known in the art and which has a lid for complete closure of the container.

Such a system requires owners of videocassette rental stores to not only provide enough floor space for public display of the information-bearing chipboard or cardboard boxes so that customers can freely choose the prerecorded programs which they wish to rent or purchase, but also to provide adequate behind-the-counter inventory areas for storing the actual videocassettes. In addition, the public is continually handling the chipboard boxes when browsing through the store to choose the videocassettes and eventually the boxes wear out. If the store has bought only a single copy of a particular videocassette program title and its box wears out, the only way to replace the box is to buy an additional copy of the videocassette which results in a needless increase in inventory costs, especially for infrequently rented videocassettes. Also, most retail store owners typically resell their videocassettes after approximately six months of customer use. To help enhance the resale value of the used cassettes, they are placed in the chipboard boxes in which they were originally shipped from the videocassette manufacturer to the rental store owner and shrink wrapped. However, excessively handled and worn boxes further reduces the attractiveness and value of the already used videocassettes as a resale item.

The subject invention enables the videocassette rental store owner to display the information-bearing chipboard boxes in several ways, either in a protective transparent sleeve with or without the actual videocassette stored therein, or in a transparent envelope attached to a cassette container with the identifying information exposed. Normally, when the store owner receives the newly purchased cassettes with their identifying cover, it is common practice for one or more side or end walls of the cover to be removed for retention and display of the cassettes in several different arrangements. The owner may elect to place the videocassette within a separate transparent sleeve together with its corresponding chipboard box and display the sleeve on a shelf to which the public has access. The customer then simply takes the sleeve and its videocassette from the shelf and delivers it to the employee at a counter for completing the rental transaction, or the cover can be disassembled or flattened and stored in a transparent envelope affixed to the rear of an open cassette box. The customer may then transport the videocassette home in the sleeve or the employee can remove the videocassette from the sleeve and place the videocassette in a usual completely enclosed videocassette storage chamber for transport to the customers home.

Further, the owner may choose merely to place the sleeve containing only the chipboard box on the public access shelves, the customer desiring to rent a particular videocassette would take the sleeve and chipboard box to an employee at the counter who would then complete the rental transaction either utilizing the sleeve for transport of the videocassette to the customers home or allowing the customer to take the videocassette home in a usual lid-type videocassette storage chamber. Thus, these alternate systems not only preserve the chipboard boxes, but the former system utilizing a transparent sleeve significantly reduces behind-the-counter storage space. Therefore, the need exists for a videocassette storage and display sleeve which retains the cover and identifies the videocassette to store and display the same, the corresponding chipboard cover having printed indicia thereon identifying a prerecorded program on the videocassette, the sleeve enabling the videocassette to be quickly and easily inserted into and removed therefrom while the chipboard cover remains in the sleeve. It is an important aspect of the present invention that the sleeve or cover be convertible into several different forms for the cover to be assembled with a separate sleeve or separate cassette box either of which may or may not retain the cassette therewith for easy identification and to facilitate rental and purchase transactions.

SUMMARY OF THE INVENTION

Objectives of the present invention include providing a videocassette storage and display sleeve or cover having identifying indicia thereon in which the videocassette can be quickly and easily inserted into and removed from the sleeve or cover for its display in several different embodiments without destruction of the cover.

Another objective of the invention is to provide an enclosing videocassette storage and display sleeve in the form of a partially opened cover having printed indicia thereon identifying a prerecorded program on the videocassette which is retained within a separate transparent sleeve or envelope such that the cover may be displayed in either rectangular or flattened form depending upon the configuration of its enclosing medium.

Another objective of the invention is to provide an enclosing videocassette storage and display cover having printed indicia thereon identifying a prerecorded program on the videocassette which may be displayed in several different forms in either a hollow rectangular storage chamber or flattened and retained within a transparent envelope and then being capable of being reformed into rectangular configuration for its utilization with several different displaying systems.

A further objective of the invention is to provide a videocassette storage and display box or cover which identifies the subject matter of the videocassette and which may be displayed in either its original rectangular form complemental to the videocassette or in flattened form for utilization in combination with a cassette container and which may be convertible from flat to reformed rectangular configuration adapted to be utilized with several different displaying systems.

A still further objective of the invention is to provide an encompassing videocassette storage and display sleeve or cover for display with or without the videocassette, the cover being convertible into several different embodiments and which may be reconverted back to its original rectangular form for resale of the videocassette.

A still further objective of the present invention is to provide a combination of elements which may be utilized with the chipboard cover identifying the videocassette, portions of the cover being separable to permit its display in several different forms and which cover can be reconverted to rectangular form complemental to the shape of the videocassette for its resale.

These objectives and advantages are obtained by the improved combination of elements including the identifying cover for a videocassette which permit it being displayed either with or without the videocassette, the cover including a pair of spaced-apart parallel front and rear walls and at least one hinged parallel side walls to form a generally rectangular-shaped storage chamber with a separate attachment tab member being capable of rejoining the front and rear walls of the cover after its original unhinged side wall is removed to permit displaying the cover in flattened form. The tab member has a U-shaped configuration with an intermediate portion complemental in width to the thickness of the original cover or box with juxtaposed pressure-sensitive adhesive material affixed to its side walls for joining the front and rear walls of the cover when the cover is reassembled into rectangular form.

BRIEF DESCRIPTION OF THE DRAWINGS

A preferred embodiment of the invention, illustrative of the best mode in which the applicant has contemplated applying the principles, is set forth in the following description and is shown in the drawings and is particularly and distinctly pointed out and set forth in the appended claims.

Similar numerals refer to similar parts and elements throughout the drawings.

DESCRIPTION OF THE PREFERRED EMBODIMENT

Figure 1:
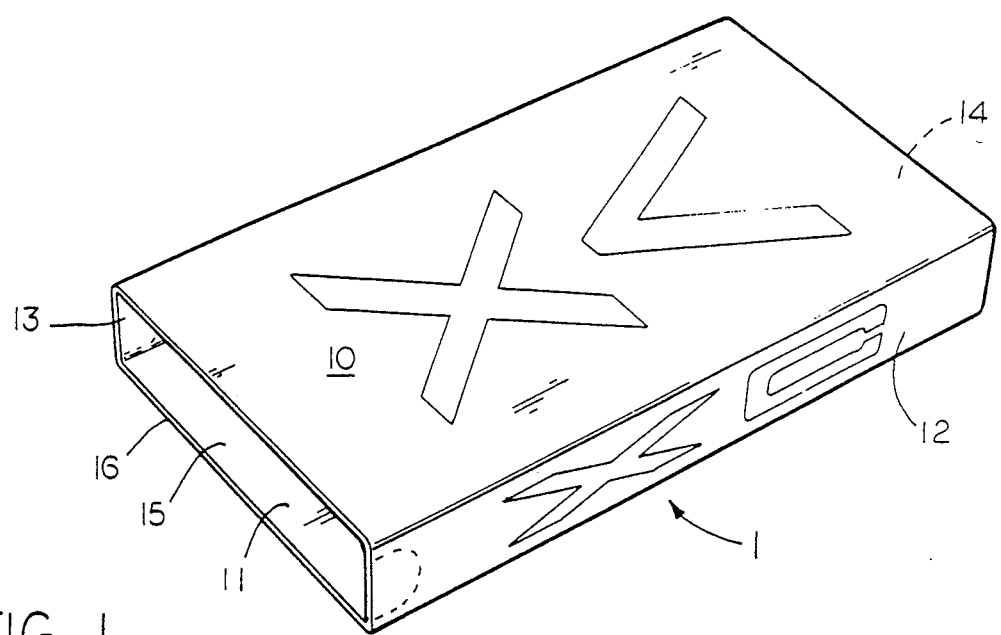
FIG. 1 is a perspective view of an identifying sleeve or cover for a videocassette.

The sleeve or cover for storing and displaying a videocassette of the present invention, is indicated generally at 1 and is shown in FIG. 1. Sleeve 1 is intended for storing and displaying a usual videocassette (not shown) of a conventional type which is well-known in the art. The chipboard cover or sleeve 1 is a type also well-known in the art and having printed indicia thereon identifying the prerecorded program contained on the videocassette. Although the preferred embodiment of the sleeve is for a videocassette, the present invention could be easily adaptable for use with audio cassettes, compact discs, etc.

Sleeve 1 comprises a pair of spaced parallel front and rear walls 10 and 11, respectively, a pair of spaced parallel sidewalls 12 and 13, and an end wall 14 which extends between and is connected to the front wall, rear wall, and sidewalls adjacent to one of the ends of sleeve 1 to close the end (FIG. 1). Front wall 10, rear wall 11, sidewalls 12 and 13, and end wall 14, form a generally rectangular-shaped storage chamber 15. The edges of walls 10-13 on the end of sleeve 1 opposite from end wall 14 define a generally rectangular-shaped opening 16 in sleeve 1 (FIG. 1), which communicates with storage chamber 15 for slidably inserting a videocassette into and removing it from the storage chamber.

Sleeve 1 preferably is formed of semi-rigid chipboard or cardboard, for example, as a one-piece member utilizing a one-piece blank which snugly fits over the videocassette. The approximate overall dimensions of sleeve 1 include a length within the range of 7 ½ and 8 inches, a width within the range of 4 ¼ and 4 ⅜ inches, and height within the range of 1 and 1 ¼ inches, to store a conventional videocassette.

Figure 2:
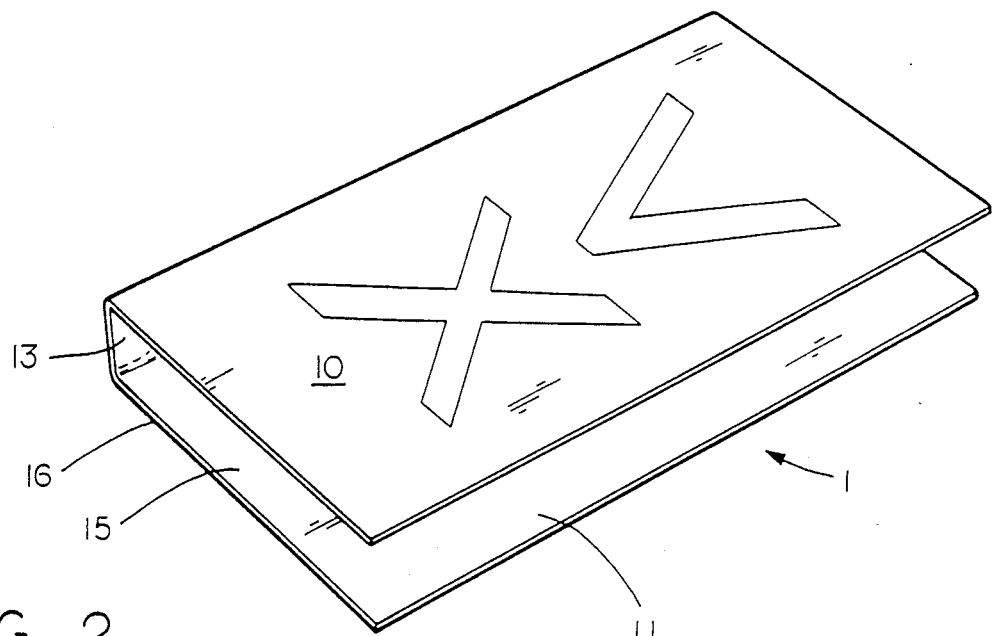
FIG. 2 is a view similar to FIG. 1 of the videocassette cover with one side wall removed.
Figure 4:
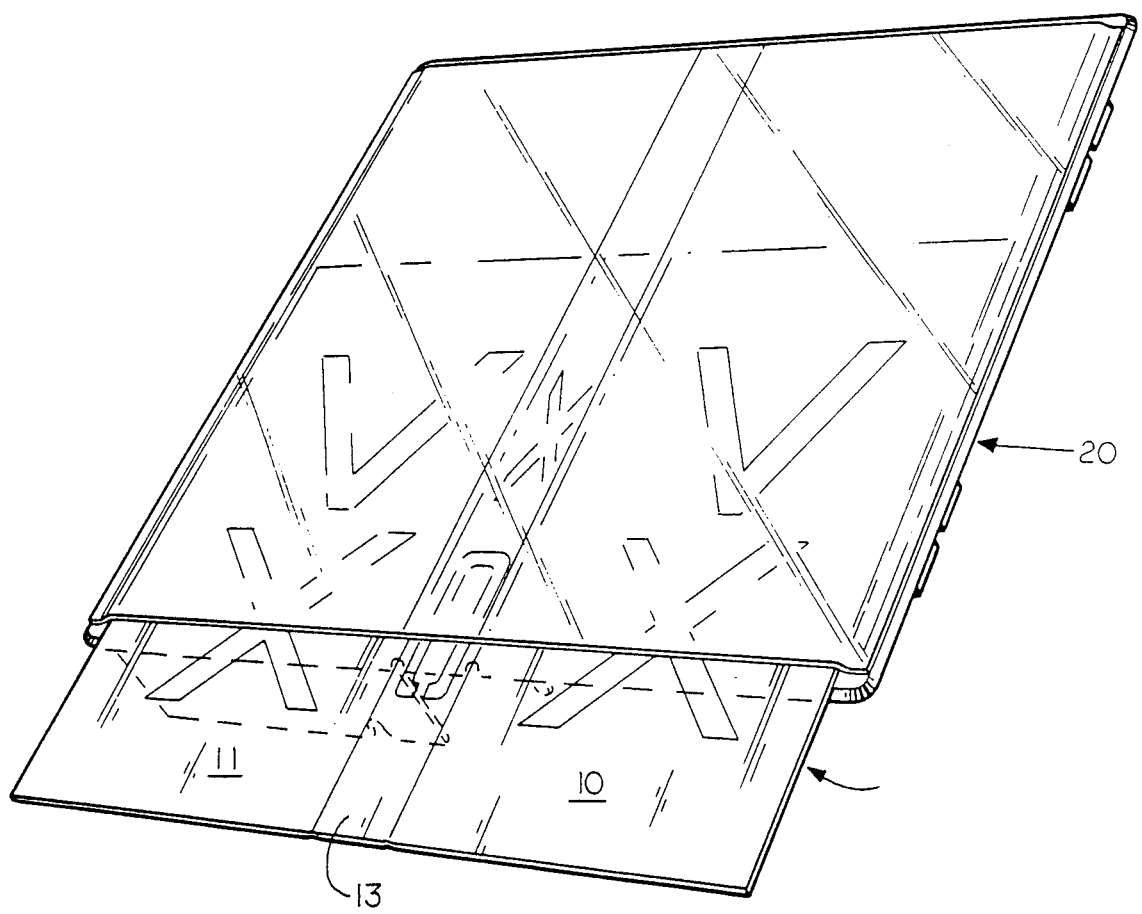
FIG. 4 is a perspective view of the videocassette cover in flattened relation in a transparent envelope to be attached to a separate cassette storage box.
Figure 6:
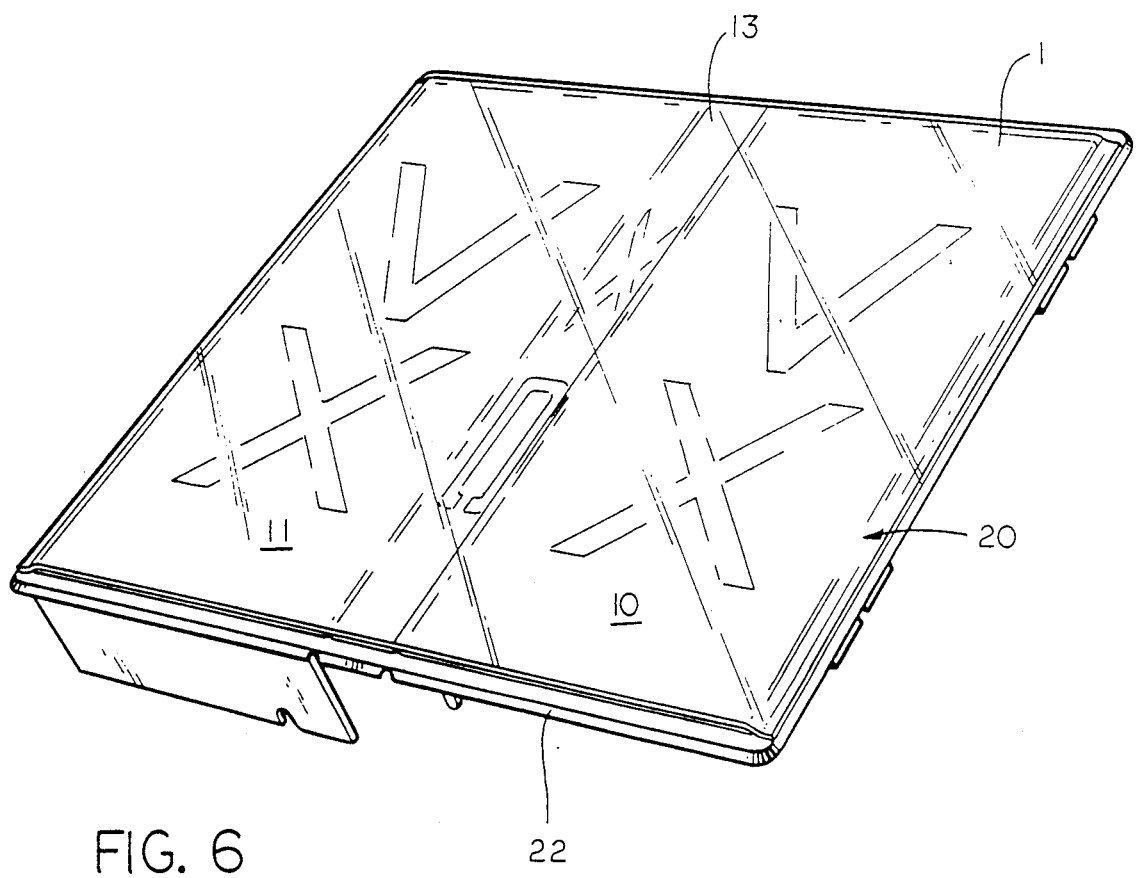
FIG. 6 is a perspective view similar to FIG. 4 with the envelope and cover attached to a cassette storage box.

As shown in FIG. 2, the sidewall 12 and closed end wall 14 are removed from the sleeve leaving sidewall 13 hingedly connecting front and rear walls 10 and 11 respectively. With the sleeve in such condition, it may be displayed in several different embodiments. In the first embodiment as shown in FIG. 4, the sleeve is opened out in flattened form and inserted into a transparent plastic envelope 20 having a complemental shape. The envelope may be formed of polyethylene or polyvinyl plastic material having at least one transparent front wall. The term "transparent" as used throughout means a "water clear" or "contact" transparency, so long as the graphics and printing on the sleeve or cover are readably visible through the outer second sleeve or envelope. One end of the envelope is open to facilitate insertion and removal of the flattened sleeve into the envelope as shown in FIG. 4. The envelope may serve to display the sleeve separately from its associated videocassette. Also the envelope 20 can be attached to the back side of a cassette storage box 22 in open relation (FIG. 6) to permit display of the identifying indicia on the sleeve attached to a storage box. The storage box 22 can also be employed to store and transport the cassette as desired with its identifying sleeve.

Figure 3:
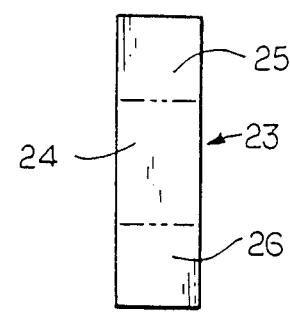
FIG. 3 is a plan view of an attachment tab member for rejoining the separated front and rear walls of the cover.
Figure 5:
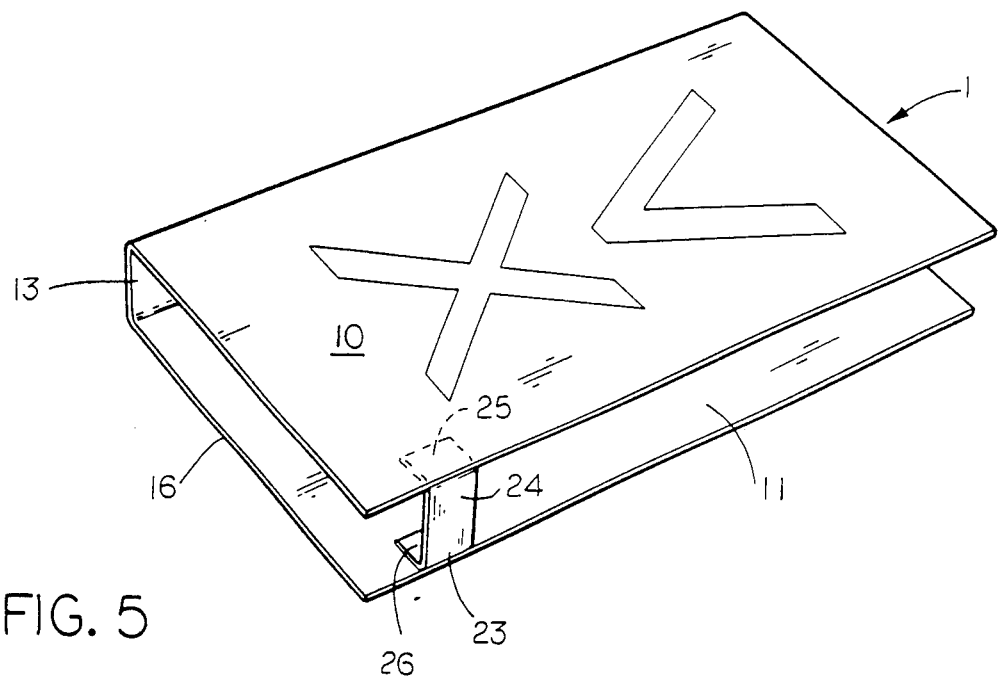
FIG. 5 is a perspective view of the cover shown in FIG. 2 with its front and rear walls rejoined by the tab member into rectangular form.

As shown in FIG. 3 a separate discrete tab member 23 is provided having a flat form such as paperboard. The tab member is preferably folded into U-shaped configuration at least partially replacing the removed sidewall 12 for converting the sleeve back into essentially rectangular form. The central portion 24 of the tab has a length comparable to the sidewall thickness of the sleeve. The tab end portions 25 and 26 have relatively short equi-dimensioned legs which have a pressure-sensitive adhesive material adhered thereto. The tab member 23 is folded into U-shaped form as shown in FIG. 5 and fitted into the sleeve near its one open end, preferably end opening 16. The adhesive material is pressed against the inner surfaces of the juxtaposed sidewalls 10 and 11 to rejoin the same into an essentially open-ended hollow rectangular storage chamber for again receiving and storing the videocassette. The tab member serves to hold the sleeve in its open relation for slidably receiving the cassette. The tab member is mounted on the sleeve closely adjacent one open end for readily receiving the cassette for its repeated removal and reinsertion.

Figure 7:
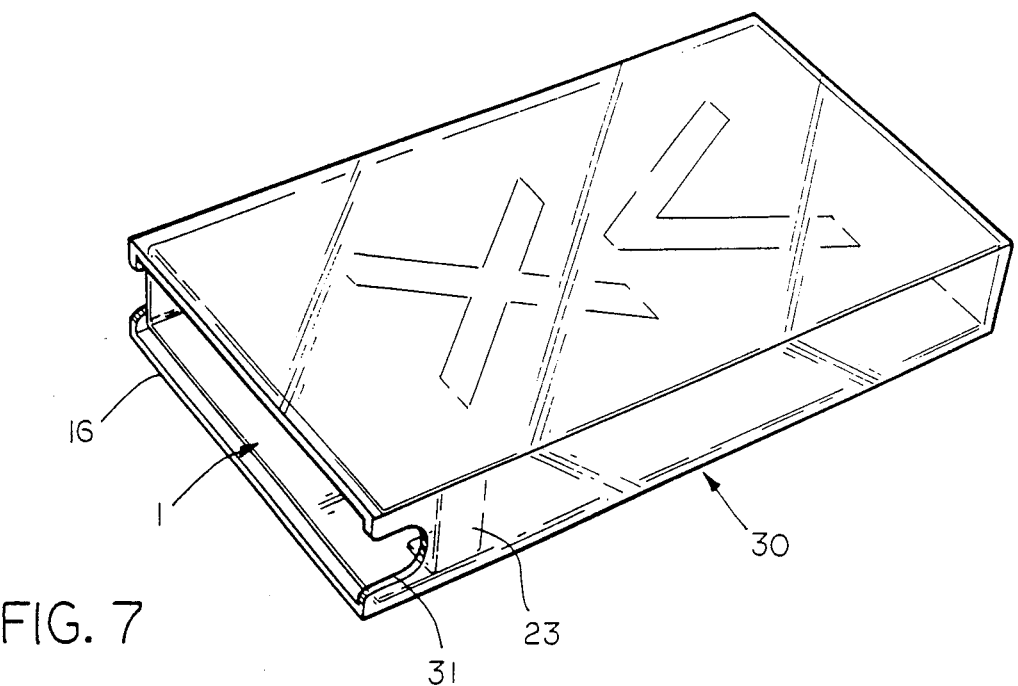
FIG. 7 is a perspective view similar to FIG. 5 with the reformed cover inserted within a separate transparent second sleeve for displaying the cover and/or videocassette.

As shown in FIG. 7 the reformed sleeve 1 carrying the identifying indicia is slid into a complementally shaped second transparent sleeve 30, the tab member holding the identifying sleeve in open relation. The second sleeve is preferably formed of a plastic material such as polypropylene or polyethylene having at least one transparent front wall to permit visual observation of the information contained on the identifying sleeve. The second sleeve containing the first sleeve or cassette cover may be used to display the first cover with or without the videocassette stored within the second sleeve. Finger access openings are provided in the second sleeve openings 31 at the open end 16 of the second sleeve to facilitate finger access to the cassette for its removal therefrom.

It will be readily apparent that the subject system of storing and displaying the cover sleeve for videocassettes in accordance with the present invention has several advantages. First, when customers browse through the store for choosing which videocassettes to rent or purchase, the sleeve summarizes the content of the videocassette and protects the box and videocassette from wear and damage from constant handling. More particularly, the identifying sleeve or cover permits various forms of displaying the cover to advertise the videocassette content. Also, the video store owner can sell the used videocassette in its original fresh-looking chipboard box or cover after a typical 6 month rental life of the videocassette has elapsed since the chipboard cover or box can be removed for reuse without damage. The tab member permits reforming the identifying sleeve or cover into its original hollow rectangular-shaped configuration. The sleeve enables the videocassette and box to be stored and displayed together thereby eliminating the need for behind-the-counter storage areas for the videocassettes separate from their corresponding chipboard sleeves or boxes in the display area of the store. Also, the sleeve can be used to safely transport a rented or sold videocassette when the videocassette is returned to the store with the cassette in the reformed sleeve. The sleeve containing the cassette can again be placed back on the rental display shelves.

Accordingly, the improved videocassette storage and display sleeve and method of its conversion are simplified providing an effective, safe, inexpensive and efficient sleeve and method of its conversion which achieves all the enumerated objectives and solves problems and obtains the new results in the art.

In the forgoing description, certain terms have been used for brevity, clearness and understanding; but no unnecessary limitations are to be implied therefrom beyond the requirements of the prior art, because such terms are used for descriptive purposes and are intended to be broadly construed.

Having now described the features, discoveries and principles of the invention, the manner in which the improved videocassette storage and display sleeve is constructed and used in several forms, the characteristics of the construction, and the advantageous, new and useful results obtained; the new and useful structures, devices, elements, arrangements, parts and combinations, are set forth in the appended claims.

I claim:

1. The method of utilizing a sleeve having identifying indicia on its exterior surfaces for storing and displaying a videocassette in several different arrangements, said sleeve consisting of a pair of spaced-apart parallel front and rear walls joined by a pair of sidewalls, said sleeve having at least one open end to form a rectangular-shaped storage chamber, the method comprising the steps of removing one lengthwise sidewall of said sleeve leaving the other sidewall hingedly connecting said front and rear walls, said sleeve being adapted to displaying its exteriorly-facing indicia in flattened relation, rejoining the edges of said front and rear walls with a discrete U-shaped tab member having adhesive material on its leg portions and an intermediate portion having a dimension complemental to the said hinged sidewall to reform said rectangular-shaped storage chamber adapted to receive said videocassette in slidable telescoping relation.

2. The method in accordance with claim 1 including the step of inserting said sleeve in flattened relation into a transparent substantially flat second sleeve or envelope for displaying said indicia.

3. The method in accordance with claim 1 including the step of inserting the reformed sleeve, having a rectangular configuration, into a transparent sleeve for displaying said indicia, the said leg portions of said tab member fixedly joining said front and rear walls in spaced relation to reform a portion of the removed sidewall.

* * * * *